(12) United States Patent
Xu et al.

(10) Patent No.: US 10,257,298 B2
(45) Date of Patent: Apr. 9, 2019

(54) ANALYZING TRACKING REQUESTS GENERATED BY CLIENT DEVICES INTERACTING WITH A WEBSITE

(71) Applicant: Facebook, Inc., Menlo Park, CA (US)

(72) Inventors: Shiliyang Xu, Redmond, WA (US); Aleksey Sergeyevich Fadeev, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/879,771

(22) Filed: Jan. 25, 2018

(65) Prior Publication Data
US 2019/0007508 A1    Jan. 3, 2019

Related U.S. Application Data

(63) Continuation of application No. 15/636,500, filed on Jun. 28, 2017, now Pat. No. 9,882,999.

(51) Int. Cl.
*G06F 15/173* (2006.01)
*H04L 29/08* (2006.01)
*G06Q 30/02* (2012.01)
*G06F 17/30* (2006.01)
*G06N 99/00* (2019.01)

(52) U.S. Cl.
CPC ........ *H04L 67/22* (2013.01); *G06F 17/30864* (2013.01); *G06N 99/005* (2013.01); *G06Q 30/0255* (2013.01)

(58) Field of Classification Search
USPC ........... 709/224; 711/118; 705/55, 14.45, 39, 705/26.63
See application file for complete search history.

(56) References Cited

U.S. PATENT DOCUMENTS

| | | | |
|---|---|---|---|
| 7,284,041 B2 | 10/2007 | Nakatani et al. | |
| 2002/0082901 A1* | 6/2002 | Dunning | G06F 17/30017 705/26.63 |
| 2009/0164378 A1* | 6/2009 | West | G06Q 10/06 705/55 |
| 2012/0215684 A1* | 8/2012 | Kidron | G06F 17/30867 705/39 |
| 2014/0223099 A1* | 8/2014 | Kidron | G06F 12/0806 711/118 |

(Continued)

*Primary Examiner* — Thanh T Nguyen
(74) *Attorney, Agent, or Firm* — Fenwick & West LLP

(57) ABSTRACT

An online system receives tracking requests from client devices interacting with a website. The online system analyzes user interactions with websites using the tracking requests. The online system predicts an accurate label for the web page that caused the tracking request to be generated. The online system uses the accurate label for generating reports describing user interactions with the website. The online system determines a quality of tracking requests generated by the website based on various factors including a number of web pages of the website that generate tracking requests, the type of information provided by the tracking requests, and so on. The online system generates reports describing the quality of the tracking requests. The online system uses a metric indicating the quality of tracking requests of the website to determine whether to use predicted labels instead of labels provided by tracking requests for generating reports of the website.

17 Claims, 10 Drawing Sheets

(56) References Cited

U.S. PATENT DOCUMENTS

| | | | |
|---|---|---|---|
| 2016/0042388 A1* | 2/2016 | Chater | G06Q 30/0246 705/14.45 |
| 2016/0078225 A1* | 3/2016 | Ray | G06F 21/554 726/23 |
| 2016/0080399 A1 | 3/2016 | Harris et al. | |
| 2016/0080417 A1 | 3/2016 | Thomas et al. | |
| 2016/0080418 A1 | 3/2016 | Ray et al. | |
| 2016/0080419 A1 | 3/2016 | Schiappa et al. | |
| 2016/0080420 A1 | 3/2016 | Ray et al. | |
| 2016/0086215 A1 | 3/2016 | Wang et al. | |
| 2016/0191465 A1 | 6/2016 | Thomas et al. | |
| 2016/0191476 A1 | 6/2016 | Schutz et al. | |
| 2017/0103177 A1* | 4/2017 | Iliff | G16H 40/20 |

* cited by examiner

ANALYZING TRACKING REQUESTS GENERATED BY CLIENT DEVICES INTERACTING WITH A WEBSITE

CROSS REFERENCE TO RELATED APPLICATIONS

This application is a continuation of U.S. application Ser. No. 15/636,500, filed Jun. 28, 2017, which is incorporated by reference in its entirety.

BACKGROUND

This disclosure relates generally to analyzing tracking requests received by an online system from client devices rendering web pages received from a website, and in particular to determining accuracy of the information provided by client devices via tracking requests to an online system.

Online systems such as social networking systems track user interactions with the online system so that they can provide features and content that is relevant to each user. The online system logs user interactions with the online system for analysis. However, online systems also prefer to monitor user interactions with external systems such as third party websites. An online system may not have direct access to logs of the external website. However, a client device can send a tracking request to the online system describing user interactions between the client device and the external website.

An external website provides instructions with the web page that are executed by the client device when the client device renders the web page. These instructions cause the tracking request to be generated for sending information to the online system. However, sometimes external websites provide inaccurate data (e.g., label the web page incorrectly or report the wrong event, fail to label the web page at all, report duplicate events, etc.). This may happen due to defects in the instructions provided by a web page to the client device for generating the tracking requests. Conventional techniques fail to detect such errors in the information reported by client devices via tracking requests. As a result, a client device provides inaccurate information to the online system. Any analysis performed by the online system based on such inaccurate data reported by a client device is inaccurate and results in the online system making incorrect inferences and taking wrong actions based on the inferences, for example, sending irrelevant content to a user.

SUMMARY

An online system receives tracking requests from client devices interacting with a website to analyze user interactions with the website. The website provides instructions with web pages sent to a client device that cause the client device to send tracking instructions to the online system. A tracking request provides a label identifying the webpage that caused the tracking request to be generated. A tracking request may incorrectly identify a web page, for example, if the instructions provided by the website for the web page include errors. The online system uses a machine learning model to predict an accurate label for the web page that caused the tracking request to be generated.

The online system extracts a feature vector for a tracking request. The feature vector comprises features based on the parameters describing the web page. The online system provides the feature vector as input to a machine learning model for predicting a label identifying the web page. In an embodiment, the machine learning model is configured to generate a score indicating an accuracy with which an input label identifies a web page of an input tracking request. The online system stores a mapping from the label received with the tracking request to the predicted label if the predicted label differs from the label received. The online system uses the mapping table to generate accurate reports describing user interactions with the website.

BRIEF DESCRIPTION OF THE DRAWINGS

The teachings of the embodiments can be readily understood by considering the following detailed description in conjunction with the accompanying drawings.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Environment

Figure 1:
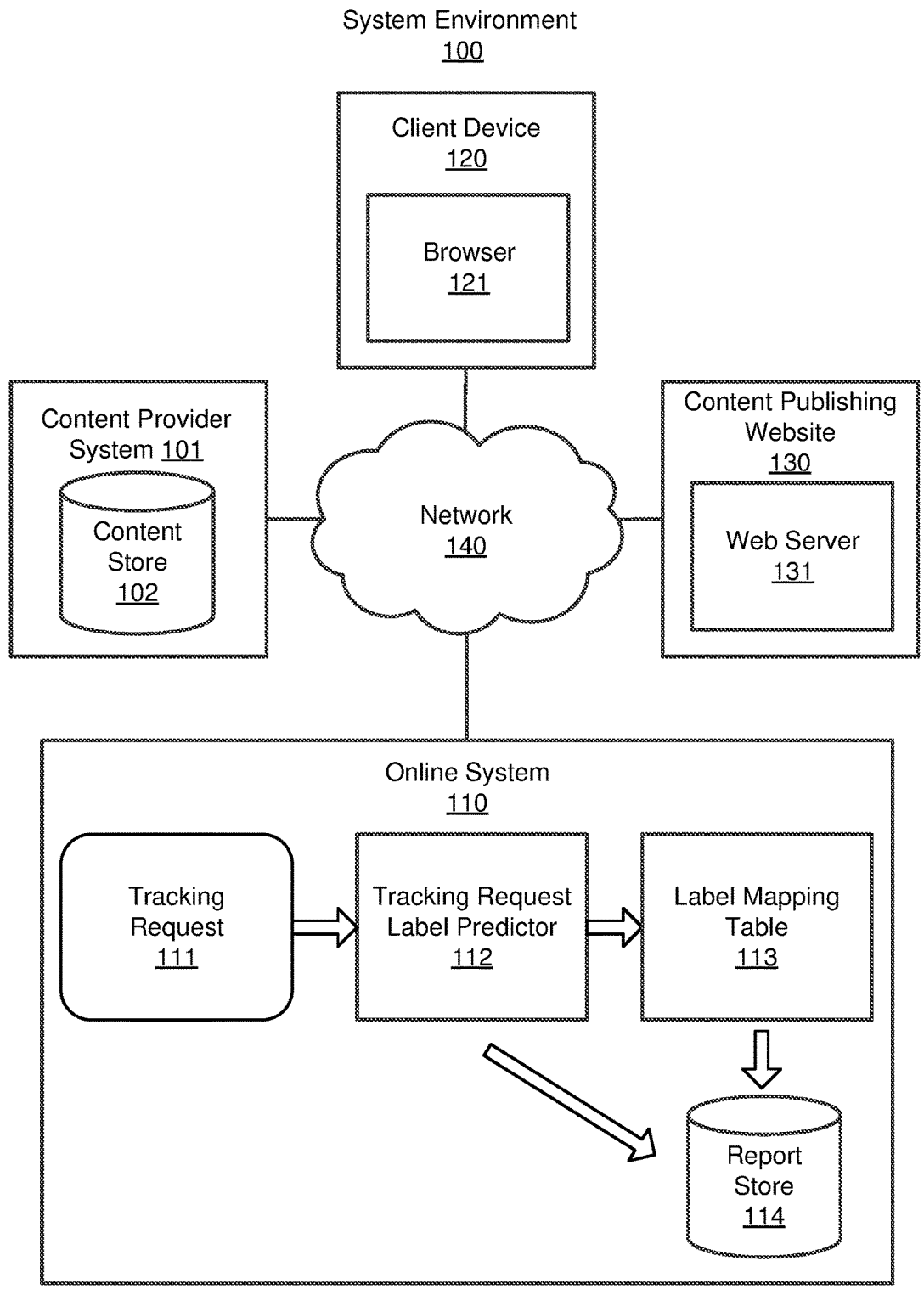
FIG. 1 is a block diagram of a system environment in which the online system operates, in accordance with an embodiment.

FIG. 1 is a block diagram of a system environment 100 in which an online system 110 operates, in accordance with an embodiment. In the embodiment illustrated in FIG. 1, the system environment 100 includes a content provider system 101, an online system 110, client devices 120, a content publishing website 130, and a network 140. The content provider system 101 includes a content store 102 for storing content items. The content publishing website 130 includes a web server 131 for delivering content items to users via client devices 120. The client devices 120 include a browser 121 that provides an interface through which users can access a content publishing website 130. The online system 110 includes, in part, a tracking request 111 signal, a tracking request label predictor 112, a label mapping table 113, and a report store 114.

The content provider system 101 shown in FIG. 1 provides electronic media content items to the online system 110 for delivering to the client devices 120. Alternatively, the content provides may provide the content to a content publishing website 130 for providing to users of the content publishing website 130. The content provider system 101 may be associated with a user, an enterprise, an organization, or a group, for example, a political campaign, a university, a corporation, the government, etc. In an embodiment, a content item is a sponsored content item for which a content provider associated with the content provider system 101 provides remuneration to the online system (or a content publisher) for delivery of the content items to an online audience via the client devices 120. The term "content item" refers to "electronic media content item" wherever it appears herein. Content items may be images, text paragraphs, video clips, audio clips, hyperlinks, online forms, etc. Examples of sponsored content items include online advertisements.

The content store 102 shown in FIG. 1 is used by the content provider system 101 for storing content items. The content store 102 may be organized as a database, table, file, etc., stored on one or more of removable or non-removable memory cards, tape cassettes, zip cassettes, and computer hard drives. The content store 102 may include multiple data fields, each describing one or more attributes of the content items. The content store 102 may include, for a single content item—a content provider identifier (e.g., whether the content item is provided by the government), a list of policies and one or more weights regarding delivering of the content item to the client devices 120 and the content publishing website 130, one or more threshold rates of client interactions, a list of desired client interactions, such as clicking on a link in a content item, closing a content item using a close button on a browser of a client device, sharing a content item from a first client device to a second client device, performing a transaction associated with a content item, and so on. The content store 102 may also store for all content items—the number of content items to be delivered in a given time interval, a length of a time interval during which the content items are expected to be delivered, an estimate of a total number of deliveries of content items during the time interval, and so on. A delivery of a content item refers to an instance of a particular content item being delivered to a user. For example, if the same content item is delivered to multiple users or multiple times to the same user, each instance is referred to as a delivery.

The content publishing website 130 can be any website that provides content to users. For example, the content publishing website 130 may be a digital publisher of newspapers, e-books, digital magazines, digital libraries, digital catalogues, etc. The content publishing website 130 may distribute content including web pages, videos, and text, for example, books, magazines, and newspapers to users through tablet reading devices, distribution via the Internet (in the form of the browser 121 accessible by the client devices 120), other interactive media, etc. The content publishing website 130 is a collection of web pages, including multimedia content, typically identified with a common domain name, and published on at least one web server 131. The content publishing website 130 may be accessible via a public Internet Protocol (IP) network, such as the Internet, or a private local area network (LAN), by referencing a uniform resource locator (URL) that identifies the site. The content publishing website 130 can have many functions and can be used in various fashions—a personal website, a commercial website for a company, a government website, a non-profit organization website, website for entertainment, social networking system, a website providing news or educational content, private website such as a company's website for its employees typically a part of an intranet, etc. In one embodiment, the content publishing website 130 can embed tracking instructions for generating tracking requests within one or more web pages of the content publishing website 130 in order to track user interactions. In an embodiment, the tracking instructions are associated with one or more tracking pixels. A tracking pixel is a portion of a web page, for example, a segment of HTML code that produces a transparent 1×1 image, an iframe, or other suitable object that may be embedded in a web page sent to a client device by the content publishing website 130. A tracking pixel is activated, or triggered, when a web page is loaded (e.g., rendered) into a user's browser 121 on a client device 120 for viewing. When a tracking pixel is rendered, the HTML code of the tracking pixel sends a tracking request, to the online system 110. The tracking request may include information describing the web page being rendered, for example, a label describing the web page, parameters describing values, data, or objects presented to the user by the web page, and so on. The online system 110 receives the tracking request. Tracking requests convey to the online system information describing user interaction of a user with a content publishing website 130 or any website external to the online system. For example, a tracking pixel may trigger on a web page of a shopping website as a user is browsing products within the website. When the tracking pixel is rendered, the client device sends a tracking request to the online system 110 identifying the user, the product the user was browsing, and any other parameters.

The client devices 120 shown in FIG. 1 can be used by online system 110 users for interacting with the online system 110 and the content publishing website 130. Each client device 120 is a computing device capable of receiving client input as well as transmitting and/or receiving data via the network 140. The client device 120 may be a conventional computer system, such as a desktop or laptop computer. Alternatively, the client device 120 may be a device having computer functionality, such as a personal digital assistant (PDA), a mobile telephone, a smartphone or another suitable device. The client device 120 may execute an application allowing a user of the online system 110 to interact with the online system 110 and/or the content publishing website 130. In one example, the client device 120 executes a browser application 121 to enable interaction between the client device 120 and the online system 110 via the network 140. In one example, the client device 120 interacts with the content publishing website 130 through an application programming interface (API) running on a native operating system of the client device 120, such as IOS® or ANDROID™. A user may download content items from the online system 110 to the client device 120 using the browser 121. In addition, a user may interact with the content items by clicking on a link in a content item, filling in client information into an online form, closing the content item using a "close window" button on the browser 121 or on the client device 120, etc.

The online system 110 receives tracking requests 111 from client devices 120, analyzes the tracking requests for accuracy, and generates a score associated with the overall quality of the information provided by the client device in the tracking requests 111. In one embodiment, the online system 110 provides tracking pixel HTML code to content publishing websites 130 that are interested in providing information describing user interactions with the content publishing website 130 to the online system 110. The online system 110 may generate reports based on the data received with tracking requests and provide to users, for example, administrators of the content publishing website 130. For example, if the online system 110 is a social networking system, the online system 110 may generate reports that combine demographic information of users that is stored in the social networking system with user interaction patterns of the content publishing website 130. This allows the content publishing website 130 to analyze how users having different demographics interact with the content publishing website 130.

In another embodiment, content publishing websites 130 may generate their own tracking pixel HTML code and associated pixel data and provide the online system 110 with tracking requests as the tracking pixel is rendered on client devices of users. In the embodiment illustrated in FIG. 1, the online system 110 comprises, in part, a tracking request 111, a tracking request label predictor 112, a label mapping table 113, and a report store 114.

A tracking request 111 is sent to the online system 110 from a content publishing website 130 for each instance that a tracking pixel placed within a web page of a content publishing website 130 is rendered by the client device. Each tracking request 111 contains a label identifying the type of web page on which the tracking pixel is embedded (e.g., a shopping cart page, a checkout page, a product page, a registration page, etc.) and parameters that describe contextual information associated with each tracking request (e.g., price of a product viewed or purchased by a user, product SKU number, product dimensions, product color, timestamp indicating when the product was viewed, etc.). In addition, each tracking request 111 includes signals describing a degree of tracking pixel coverage supported by a content publishing website 130 (e.g., full website coverage) and a conversion value (e.g., cost of a purchased product). Because the pixel data contained within each tracking request may be generated by a content publishing website 130, labels may not accurately reflect the type of web page from which the tracking request was sent. For example, a tracking pixel embedded within a registration web page of a content publishing website 130 may be incorrectly labeled as a checkout web page. Accordingly, the tracking pixel of the registration web page may be triggered by a client device 120 which sends a tracking request 111 to the online system 110 identifying the registration web page as a checkout web page, thereby providing an incorrect label. In an embodiment, the online system 110 uses the parameters received in the tracking request (e.g., contextual information associated with the tracking request) to determine whether the label is correct. Furthermore, if the online system 110 determines that the label is incorrect, the online system 110 generates a correct label to describe the web page.

The tracking request label predictor 112 receives a tracking request 111 from a content publishing website 130 as input and predicts a label identifying the web page on which it is embedded. The tracking request label predictor 112 can use parameters included with the tracking request 111 to identify contextual information associated with the tracking pixel triggering event. If the parameters provided in the tracking request 111 indicate that the web page may be incorrectly labeled, the tracking request label predictor 112 predicts the correct label based on parameters to the label mapping table 113. The online system 110 may generate a label mapping table 113 that provides a mapping from incorrect labels to the correct label. The mapping table 113 may be used internally by the online system 110, or provided to the content publishing website 130. In an embodiment, if the online system generates reports describing the content publishing website 130, the online system may convert incorrect labels to correct labels based on the label mapping table 113 to generate an accurate report. These reports are stored in the report store 114. The tracking request label predictor 112, label mapping table 113, and the report store 114 will be discussed further in the following section.

The content provider system 101, content publishing website 130, client devices 120, and the online system 110 are configured to communicate via the network 140 shown in FIG. 1, which may comprise any combination of local area and/or wide area networks, using both wired and/or wireless communication systems. In one embodiment, the network 140 uses standard communications technologies and/or protocols. For example, the network 140 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, all or some of the communication links of the network 140 may be encrypted using any suitable technique or techniques.

The online system 110 as disclosed provides benefits and advantages that include increased engagement of users with content items. Other advantages of the system include efficient delivery of content to users by eliminating delivery of content items in cases where users are unlikely to interact with the content items, faster processing of the online system since fewer content items are transmitted, less power consumption, lower latency in content transmission, less data transmitted over the network, etc.

System Architecture

Figure 2A:
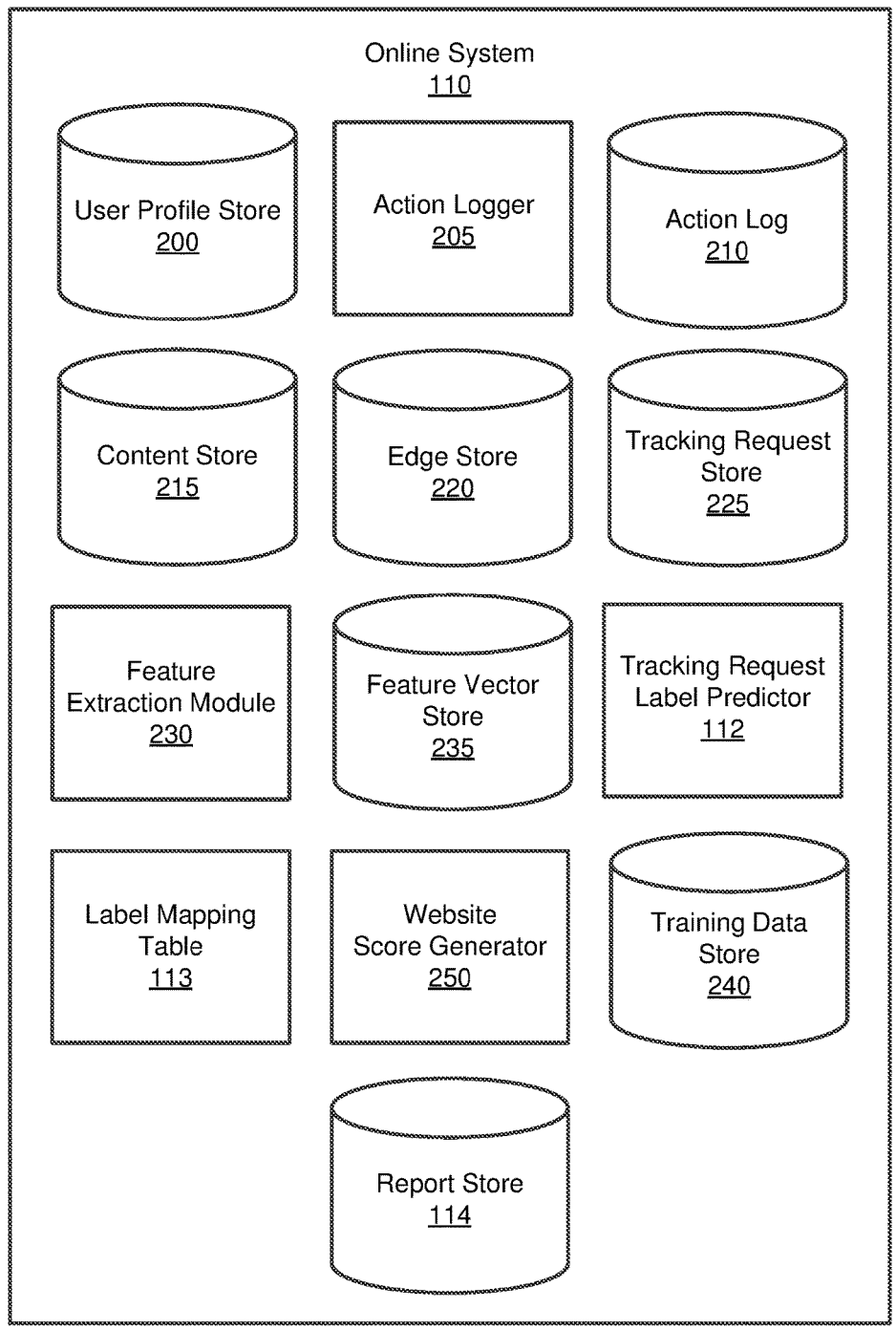
FIG. 2A is a block diagram of a system architecture of the online system, in accordance with an embodiment.

FIG. 2A is a block diagram of an online system 110 according to one embodiment. In the embodiment illustrated in FIG. 2A, the online system 110 includes a user profile store 200, an action logger 205, an action log 210, a content store 215, an edge store 220, a tracking request store 225, a feature extraction module 230, a feature vector store 235, a tracking request label predictor 112, a training data store 240, a label mapping table 113, a tracking request score generator 245, and a report store 114. In other embodiments, the online system 110 may include additional, fewer, or different components for various applications. Conventional components such as network interfaces, security functions, load balancers, failover servers, management and network operations consoles, and the like are not shown so as to not obscure the details of the system architecture.

Each user of the online system 110 is associated with a user profile, which is stored in the user profile store 200. A user profile includes declarative information about the user that was explicitly shared by the user and may also include profile information inferred by the online system 110. In one embodiment, a user profile store 200 of an online system user includes multiple data fields, each describing one or more attributes of the user. Examples of information stored in a user profile store 200 include biographic, demographic, and other types of descriptive information, such as work experience, educational history, gender, hobbies or preferences, location and the like. A user profile may also store other information provided by the user, for example, images or videos. In certain embodiments, an image of a user may be tagged with information identifying the online system 110 user displayed in an image. A user profile in the user profile store 200 may also maintain references to actions by the corresponding user performed on content items in the action log 210.

While user profiles in the user profile store 200 are frequently associated with individuals, allowing individuals to interact with each other via the online system 110, user profiles may also be stored for entities such as businesses or organizations. This allows an entity to establish a presence on the online system 110 for connecting and exchanging content with other online system 110 users. The entity may post information about itself, about its products or provide other information to users of the online system 110 using a brand page associated with the entity's user profile. Other users of the online system 110 may connect to the brand page to receive information posted to the brand page or to receive information from the brand page. A user profile associated with the brand page may include information about the entity itself, providing users with background or informational data about the entity.

The action logger 205 receives communications about user actions internal to and/or external to the online system 110, populating the action log 210 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 210.

The action log 210 may be used by the online system 110 to track user actions on the online system 110, as well as actions on content publishing websites 130 that communicate information to the online system 110. Users may interact with various objects on the online system 110, and information describing these interactions is stored in the action log 210. Examples of interactions with objects include: viewing videos, commenting on posts, sharing links, checking-in to physical locations via a mobile device, accessing content items, and any other suitable interactions. Additional examples of interactions with objects on the online system 110 that are included in the action log 210 include: viewing videos posted by a user's connections in the online system 110, commenting on a photo album, communicating with a user, establishing a connection with an object, joining an event, joining a group, creating an event, authorizing an application, using an application, expressing a preference for an object ("liking" the object), and engaging in a transaction. Additionally, the action log 210 may record a user's interactions with sponsored content on the online system 110 as well as with other applications operating on the online system 110. In some embodiments, data from the action log 210 is used to infer interests or preferences of a user, augmenting the interests included in the user's user profile store 200 and allowing a more complete understanding of user preferences.

In one embodiment, the edge store 220 stores information describing connections between users and other objects on the online system 110 as edges. Some edges may be defined by users, allowing users to specify their relationships with other users. For example, users may generate edges with other users that parallel the users' real-life relationships, such as friends, co-workers, partners, and so forth. In one embodiment, the user profile store 200 stores data describing the connections between different users of the online system 110, such as the number of friends shared between the users out of the total number of friends, the fraction of time since joining or becoming a member of the social networking system that overlaps between the two users (e.g., whether the users joined the online system at the same time or have an overlap for a certain period of time), or a combination of these signals. The record of users and their connections in the online system 110 may be called a "social graph."

Other edges are generated when users interact with objects in the online system 110, such as expressing interest in a page on the online system 110, sharing a link with other users of the online system 110, viewing videos posted by other users of the online system 110, and commenting on posts or videos provided by other users of the online system 110. The connections between users and other objects, or edges, can be unidirectional (e.g., a user following another user) or bidirectional (e.g., a user is a friend with another user).

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 110, or information describing demographic information about a user. Each feature may be associated with a source object or user, a target object or user, and a feature value. A feature may be specified as an expression based on values describing the source object or user, the target object or user, or interactions between the source object or user and target object or user. Hence, an edge may be represented as one or more feature expressions.

The edge store 220 also stores information about edges, such as affinity scores for objects, interests, and other users. In one embodiment, affinity scores, or "affinities," are computed by the online system 110 over time to approximate a user's interest in an object or another user in the online system 110 based on the actions performed by the user. A user's affinity may be computed by the online system 110 over time to approximate a user's affinity for an object, interest, and other users in the online system 110 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 220, in one embodiment. Alternatively, each interaction between a user and a specific object is stored as a separate edge.

The content store 215 stores objects that represent various types of content. Examples of content represented by an object include a video, page post, status update, photograph, link, shared content item, gaming application achievement, check-in event at a local business, brand page, or any other type of content. Online system 110 users may create objects stored by the content store 215, such as status updates, photos tagged by users to be associated with other objects in the online system 110, events, groups, or applications. In some embodiments, objects are received from content publishing websites 130 and placed in the content store 215. These objects may represent sponsored content campaigns provided to the content publishing website 130 by a content provider system 101.

The tracking request store 225 receives data corresponding to one or more tracking requests 111 sent from client devices responsive to rendering web pages of a content publishing website 130. In an embodiment, the online system 110 receives and stores a sequence of tracking requests 111 associated with a user session. Here, a user session may correspond to a sequence of web pages visited by a user on a particular content publishing website 130 from the time the user connects with the content publishing website 130 to the time the use completes the interactions (e.g., when user performs a log out or check out operation). Each tracking request 111 within a user session receives its own entry in the tracking request store 225, and contains data (e.g., label and parameters) that describe the web page that triggered the tracking request 111 from the client device.

Figure 4:
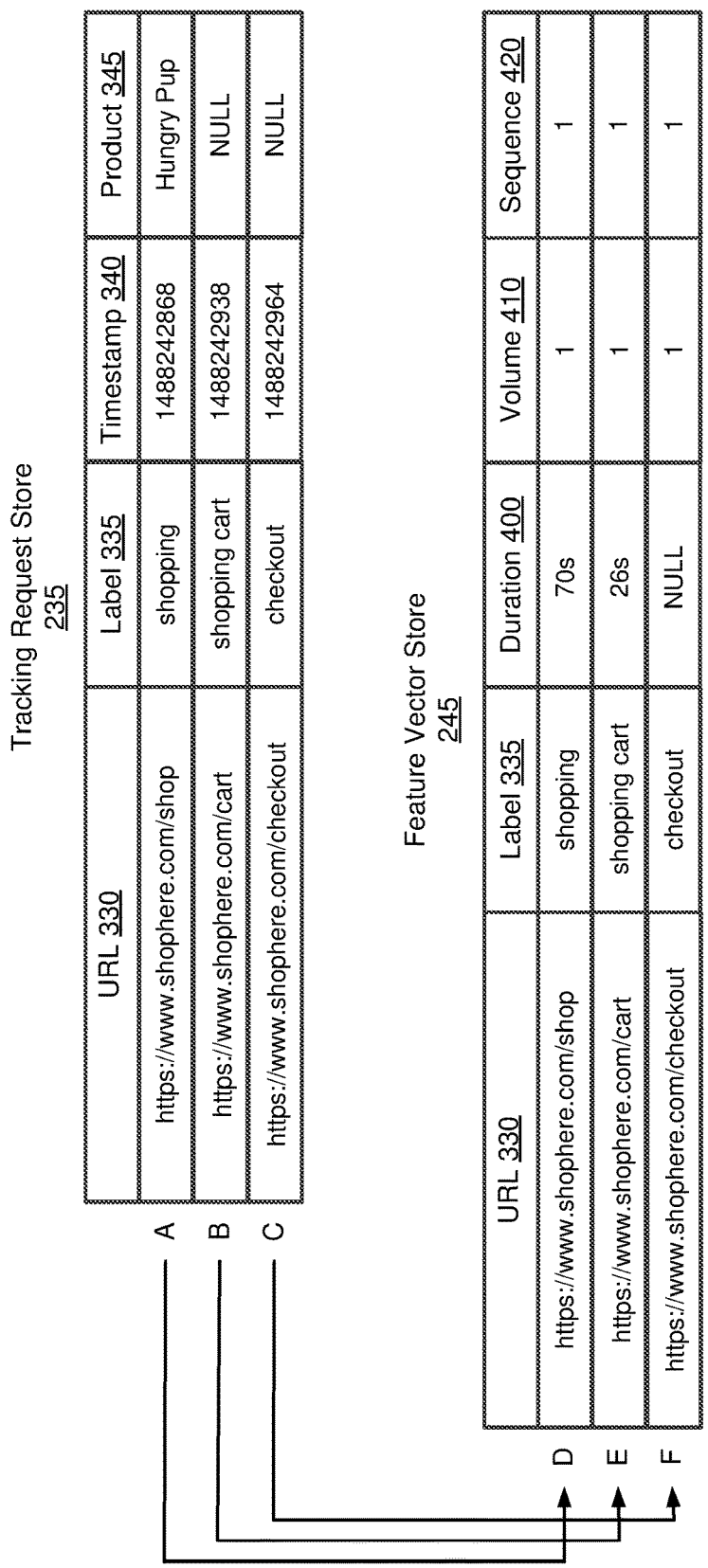
FIG. 4 illustrates an example use case of generating and storing feature vectors, in accordance with an embodiment.

In one embodiment, such as that illustrated in FIG. 4, each entry in the tracking request store 235 (e.g., entries A, B, and C) includes a label 335 that was provided by the web page rendered by the client device and parameters including a URL 330 of the web page rendered by the client device, a timestamp 340 of the time when the web page was rendered, and a description of a product 345 that was described in the web page rendered by the client device. Other embodiments may include additional parameters that describe a product size, color, and SKU number, in addition to a label 335. This data may also include the identification of the user that generated the user session if the content publishing website 130 requires users to login. In yet another embodiment, parameters for an entry in the tracking request store also include one or more cookies stored in the client device.

The feature extraction module 230 identifies tracking request 111 entries in the tracking request store 225 and generates a feature vector for each entry. Each feature vector is comprised of features extracted from a tracking request 111. A feature may be based on data provided by the client device with a tracking request, for example, various parameters provided by the web page corresponding to the tracking request. A feature may be based on a plurality of tracking requests associated with a single user session. For example, a feature vector may contain features providing contextual information indicating the number of tracking requests 111 within in a user session, a total time duration for which a web page was displayed by the client device 120 before the next web page was loaded, a count of how many times a tracking request having a particular label was received within a user session, a relative position of the tracking request on a time line of the user session, for example, whether the tracking request was generated in the beginning of the user session, middle of the user session, or towards the end of the user session, etc. These features provide the online system 110 with additional context in determining if web pages within a given user session on a content publishing website 130 are labeled correctly. Each feature vector generated by the feature extraction module 230 is stored in the feature vector store 245.

The feature vector store 245 stores feature vectors generated by the feature extraction module 230. In one embodiment, such as that illustrated in FIG. 4, each entry in the feature vector store 245 (e.g., entries D, E, and F) contains information extracted from each tracking request 111 entry in the tracking request store 235. As illustrated, feature vector store 245 entry D contains the URL 330 and label 335 information as contained in the tracking request 111 to which it corresponds (e.g., tracking request store 235 entry A). However, the feature vector store 245 also includes a duration 400 for which the web page corresponding to the tracking request was shown on the client device. The duration 400 may be determined as a difference in timestamps 340 of the next tracking request, i.e., entry B and the timestamp of the currest tracking request, i.e., entry A (e.g., 1488242938 seconds–1488242868 seconds=70 seconds). This duration provides the tracking request label predictor 112 with additional contextual information when determining if the label describing tracking request store 235 entry A is correct or not. In an embodiment, the online system 110 associated each type of tracking request with an expected duration based on historical data, for example, typically users spend t1 time on an average on a shopping web page and t2 time on a checkout web page. For example, a user of a content publishing website 130 may be able to complete browsing an item for purchase on a "shopping" web page within 70 seconds, indicating that the web page may be correctly labeled. Conversely, if the duration 400 indicates that the user spent only 1 second shopping, for example, the label 335 indicating that the web page is a "shopping" web page may be incorrect. Features are provided as input into the tracking request label predictor 112, providing it with contextual information indicating the accuracy of the label 335 provided in the tracking request store 235.

The tracking request label predictor 112 uses machine learning techniques to train one or more models to predict labels associated with tracking requests 111 received by the online system 110. Machine learning techniques include, for example, linear regression, decision trees, support vector machines, classifiers (e.g., a Naive Bayes classifier), and gradient boosting. The tracking request label predictor 112 takes, as input, feature vectors generated by the feature extraction module 230 and generates, as output, a score indicating a likelihood that labels contained in the feature vectors accurately describe types of web pages.

The tracking request label predictor 112 is trained by the online system 110 using parameters stored in the training data store 240. The training data store 240 stores past tracking requests and accurate labels for the tracking requests. The tracking requests stored in the training data store includes tracking requests representing positive and negative examples for each type of tracking request. A positive example for a label includes features that correspond to the label of the web page and a negative example includes features that do not correspond to the label of the web page.

The online system 110 uses the output scores indicating a likelihood for each label type to identify the label most likely to be correct. For example, if the tracking request label predictor provides an output score indicating a 70% likelihood that a web page is a "checkout" web page and a 10% likelihood that the same web page is a "payment" web page, the online system 110 verifies whether the label provided as input in the feature vector matches that with the highest output score. If the labels match, the online system 110 determines that the web page is labeled correctly; if the labels are mismatched, the label with the highest output score is selected as a replacement label for the web page and stored in the label mapping table corresponding to that particular content publishing website 130.

The label mapping table 113 is a data structure maintained by the online system 110 that maps an incorrect label describing a web page type provided by a content publishing website 130 to a correct label generated by the tracking request label predictor 112. In one embodiment, the online system 110 supplies these correct label to the content publishing website 130 so that the website may update its incorrect labels with correct labels. In another embodiment, if the content publishing website 130 does not update incorrect labels, the online system 110 uses the label mapping table 113 upon receiving a tracking request to map the incoming label and a URL of the webpage that sent the tracking request to the correct label as stored in the label mapping table 113.

The report store 114 stores information describing user actions, or "user action reports," and reports indicating the accuracy of labels describing web page types, or "label accuracy reports," to be provided to content publishing websites 130. The online system 110 uses the label mapping table 113 to generate, both, user action reports and label accuracy reports. User action reports provide the content publishing website 130 with information describing how a user navigates the content publishing website 130. For example, if the user action report indicates that a user spent a threshold amount of time on a particular checkout web page, it may be determined that the user might have been having difficulty during the checkout process, perhaps due to unintuitive web page layout. Similarly, the label accuracy reports indicate to the content publishing website 130 the accuracy of the labels provided in tracking requests 111. If the content publishing website 130 does not update labels contained therein, these reports may include inaccurate information.

The website score generator 250 generates a score for the content generator website 130. The score for the content generator website 130 measures quality of the tracking requests reported by client devices that access the web pages of the content generator website 130. The website score generator 250 measures the quality of the content generator website 130 based on various factors including the fraction of the web pages of the content generator website 130 that generate tracking requests, the accuracy of the labels reported by tracking requests reported by client devices that access the web pages of the content generator website 130, and so on.

Figure 2B:
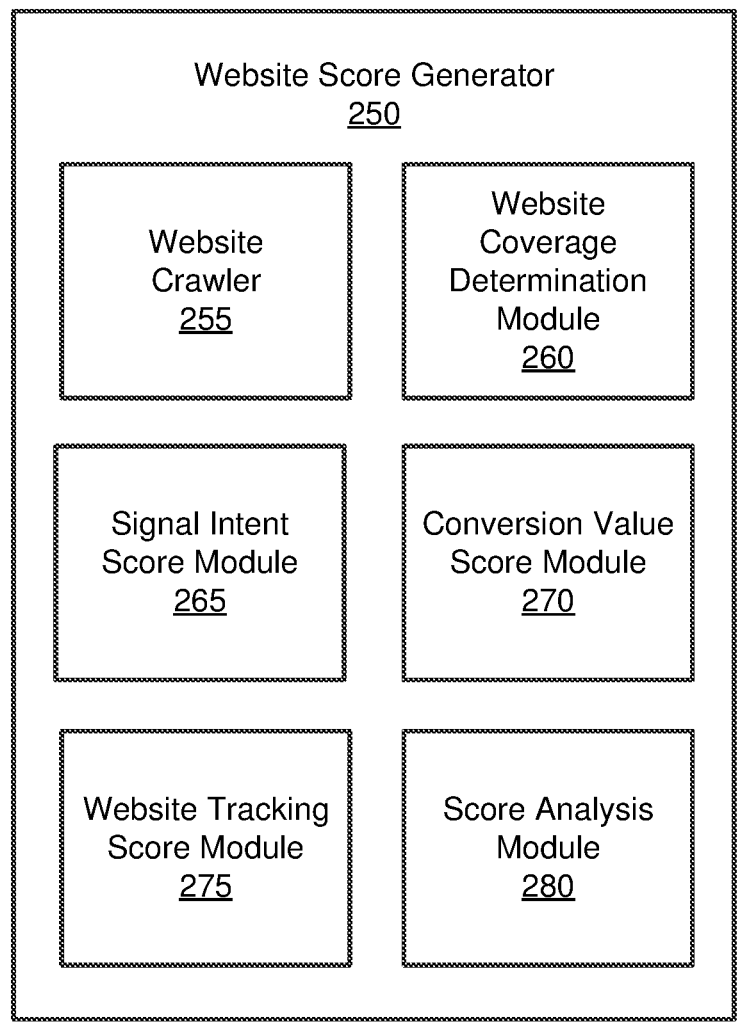
FIG. 2B is a block diagram of a system architecture of the website score generator, in accordance with an embodiment.

FIG. 2B is a block diagram of a system architecture of the website score generator 250, in accordance with an embodiment. The website score generator 250 comprises a website crawler 255, a website coverage score module 260, a signal intent score module 265, and a conversion value score module 270. In other embodiments, the website score generator 250 may comprise more, fewer, or other modules. Functions described herein may be implemented in modules different from those indicted herein.

The website coverage score module 260 determines a score for a content generator website 130 indicative of a percentage of the web pages of the content generator website 130 that include instructions that generate tracking requests when processed by a client device 120.

The signal intent score module 265 determines a signal intent score for the content generator website 130. The signal intent score module 265 determines a signal intent score for various types of tracking requests that are generated by client devices that render web pages received from the content generator website 130. The signal intent score is a measure of a likelihood that a user will complete a particular target user action on the content generator website 130, for example, performing a transaction or submitting a registration form. A user typically performs a sequence of preliminary user interactions before performing the target user interaction. For example, a user may perform certain searches, adding products to a shopping cart, checking out, and so on before completing a purchase transaction.

The signal intent score module 265 stores a first mapping table that maps labels of tracking requests to user interaction types. The signal intent score module 265 stores a second mapping table that maps user interaction types to signal intent score values. In some embodiments, the signal intent score module 265 stores mapping tables from labels to signal intent score values. The mapping tables may be generated based on information provided by an expert user.

A high signal intent score of a particular user interaction indicates that there is a high likelihood of the user completing the target user interaction if the user just performed the particular user interaction. Similarly, a low signal intent score of a particular user interaction indicates that there is a low likelihood of the user completing the target user interaction if the user just performed the particular user interaction. For example, a user interaction representing a product search has a low signal intent score since several users perform several product searches without making a purchase. In contrast, a checkout operation has a high signal intent score since a user performing a checkout operation is very likely to provide the remaining details to complete the purchase. In an embodiment, the signal intent score module 265 stores numeric or alphanumeric values of signal intent score, such as letters A-E, where A implies high signal intent score and E implies low signal intent score, or numbers from 1-10, where 1 implies low signal intent score and 10 implies high signal intent score.

The signal intent score module 265 identifies the various types of user interactions of the content generator website 130 that are reported by client devices via tracking requests. The signal intent score module 265 determines signal intent scores for various types of user interactions reported by the client devices via tracking requests. The signal intent score module 265 aggregates signal intent scores for the different types of user interactions to determine a signal intent score for the content generator website 130.

Example Process

Figure 3:
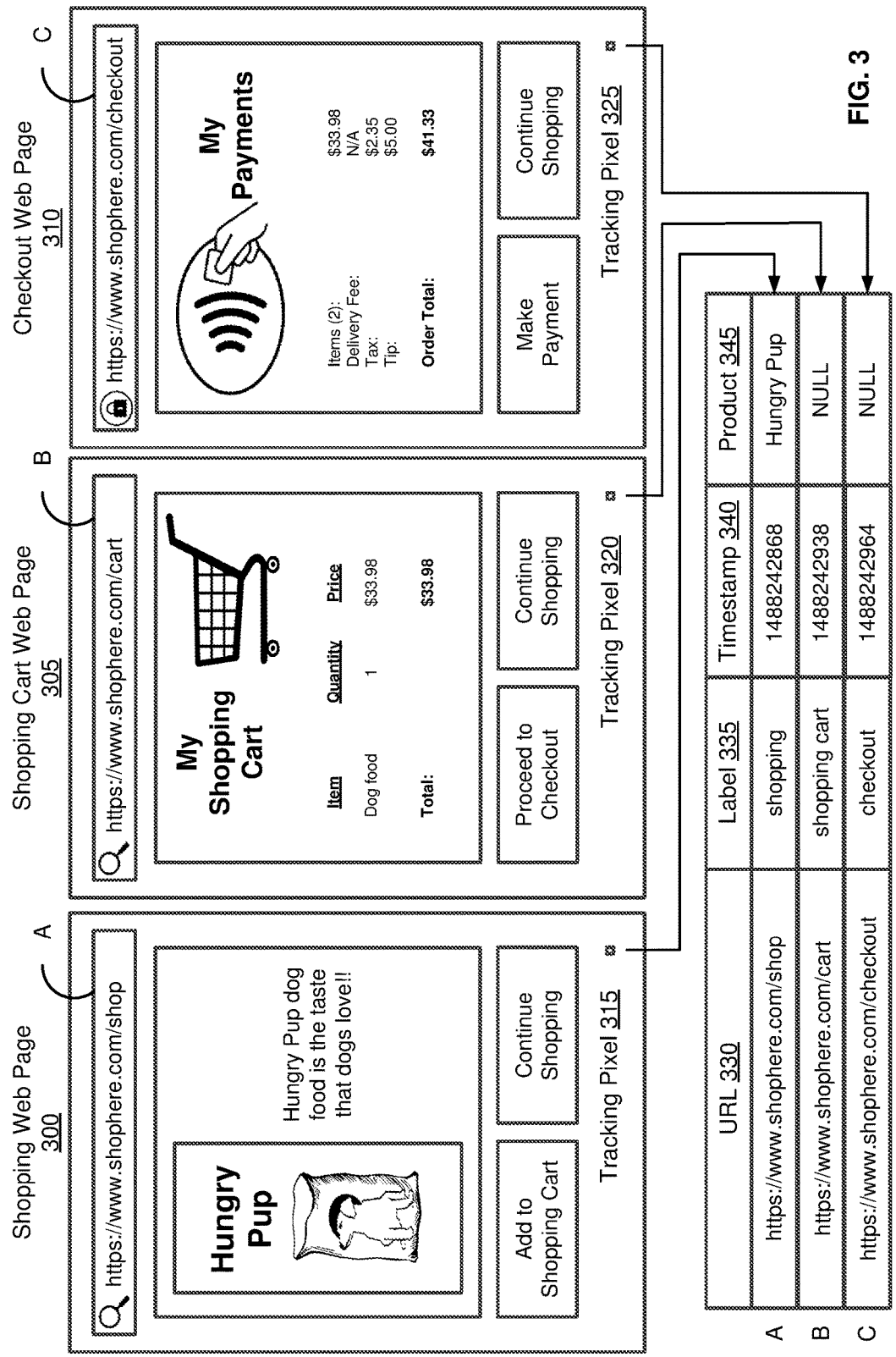
FIG. 3 illustrates an example use case of receiving and storing tracking requests, in accordance with an embodiment.

FIG. 3 illustrates an example use case of receiving and storing tracking requests, in accordance with an embodiment. In the embodiment illustrated in FIG. 3, each tracking request sent by web pages 300-310 is stored in the tracking request store 235 as a separate entry associated with the same user session (e.g., shopping experience). As illustrated in this example use case, a user first visits URL A (e.g., https://www.shophere.com/shop). This shopping web page 300 contains a tracking pixel 315 that sends a tracking request 111 to the online system 110 as the web page is loaded into a browser 121 on the user's client device 120. The online system 110 receives the tracking request 111 and stores it in the tracking request store 235. This tracking request 111 includes a URL 330 (e.g., https://www-.shophere.com/shop), a label 335 (e.g., shopping), a timestamp 340 (e.g., 1488242868), and a description of the product 345 (e.g., Hungry Pup).

When the user has completed selecting items for purchase, the user advances to a shopping cart web page 305 in order to review items for purchase. Similar to the shopping web page 300, the shopping cart web page 305 also includes a tracking pixel 320 that indicates to the online system 110 that the tracking request 111 originated on a shopping cart web page 305. This is illustrated in the figure in the entry for URL B in which the label 335 indicates a shopping cart web page, documents a timestamp 340, and provides a description of the product, if any (e.g., no product to describe is NULL).

Lastly, when the user has selected all the items for purchase, placed the items in a shopping cart, and loads a checkout web page 310, another tracking pixel 325 sends a tracking request specifying a label 335 (e.g., checkout), a timestamp 340 (e.g., 1488242964), and a description of the product 345. This information is contained in its own entry (e.g., URL C) within the tracking request store 235, thus completing the user session.

Feature Extraction Process

FIG. 4 illustrates a process by which the feature extraction module 230 generates feature vectors from the entries contained in the tracking request store 225. Like the tracking request store 225, the feature vector store 235 contains tracking request parameters. However, the feature vector store 235, in addition, contains contextual information used by the tracking request label predictor 112 to further qualify the validity of parameters passed with a tracking request 111. For each entry in the tracking request store 225, the feature extraction module 230 generates a feature vector. In the embodiment illustrated in FIG. 4, this feature vector propagates the original URL and label into the feature vector, but identifies contextual information such as the duration 400 a user spent on respective web pages throughout a session, the volume 410 indicating the number of instances of tracking requests with identical labels received within a session, and the sequence 420 in which each tracking pixel sent a tracking request. In an embodiment, various attributes describing the sequence 420 may be included in the feature vector, for example, the number of tracking requests within the sequence, the length of time interval of the sequence, the position of the current tracking request within the sequence, and so on. For example, the feature vector may include a feature indicating whether the tracking request is in the beginning of the sequence, in the middle of the sequence or at the end of the sequence. Certain types of tracking requests are more likely to occur in certain positions in a sequence of tracking requests associated with a session, for example, a tracking request indicating a web page for performing search for a product is likely to occur in the beginning of a sequence and a tracking request indicating a web page for performing a checkout is more likely to occur at the end of the sequence.

The online system 110 uses the contextual information to further analyze the accuracy associated with tracking requests 111. For example, if the sequence indicated in the tracking request store 225 instead contained a checkout event before a cart event, one of the two, or both, tracking requests 111 might have been mislabeled. In another example, if the contextual information extracted for the tracking request store 225 indicated multiple checkout events, one or more of the events could be mislabeled as there is typically one checkout event within each session. Similarly, if the contextual information indicates that multiple registration forms were submitted in the same session, the tracking request is likely to be mislabeled. In yet another example, if the contextual information indicated that a checkout event took only a fraction of one second, as indicated by its timestamp, it might be indicative of a mislabeled tracking pixel on the checkout web page.

Process for Correcting Labels of Tracking Requests

Figure 5:
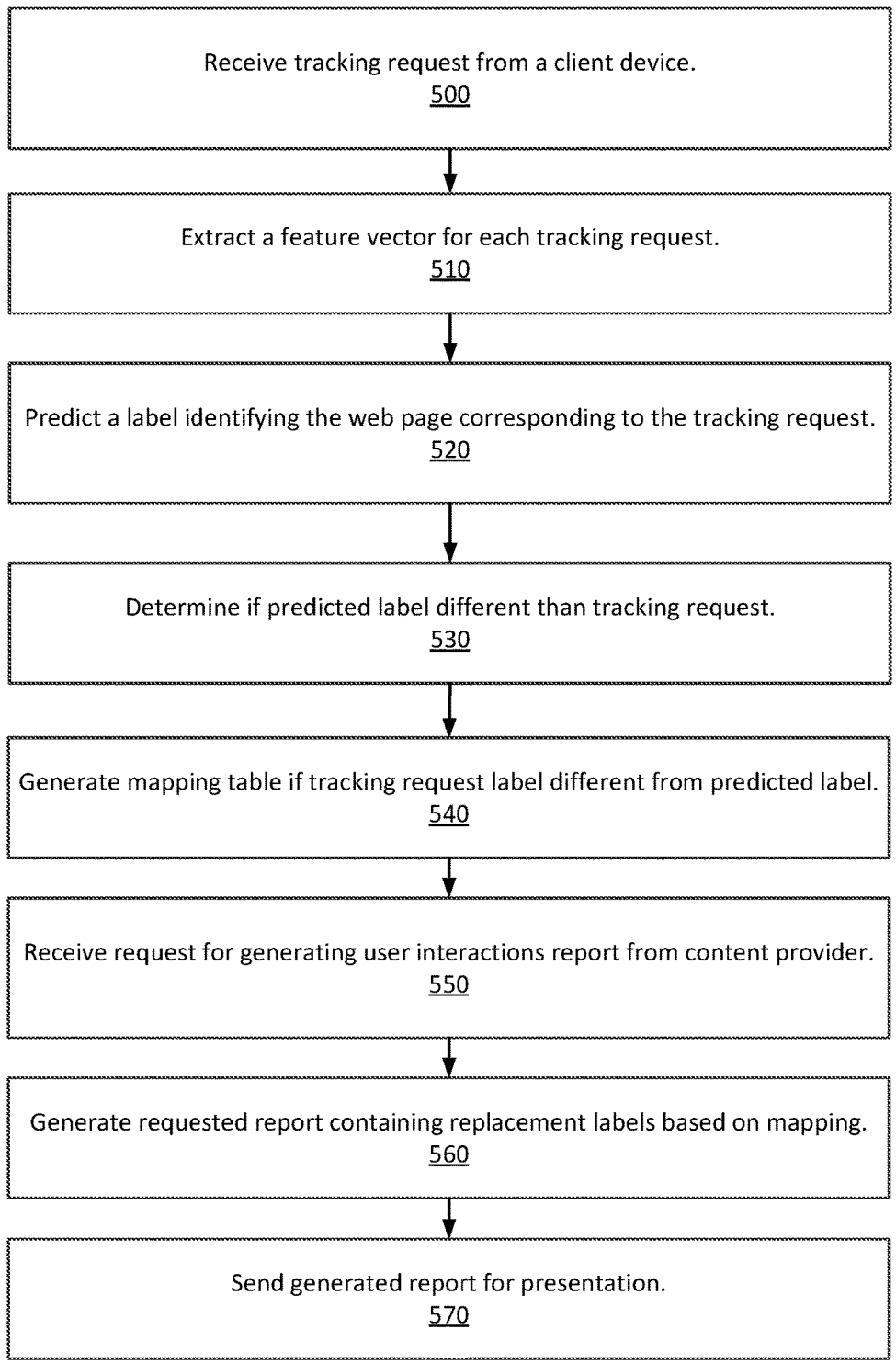
FIG. 5 illustrates a flowchart of the process for determining the quality of tracking requests, in accordance with an embodiment.

FIG. 5 illustrates a process for generating a label accuracy report for a content provider. The online system receives 500 a tracking request from a client device indicating that a web page containing a tracking pixel has been displayed to a user. This tracking request is associated with parameters that the feature extraction module uses to extract 510 feature vectors. The tracking request label predictor predicts 520 a label for the web page corresponding to the tracking request. If the label provided in the tracking request differs from the predicted label produced by the tracking request label predictor, generate 540 a mapping table that maps the tracking request label to the predicted label. When the online system receives 550 a request for a label accuracy report from a content provider, the online system generates 560 the requested report containing replacement labels based on the mapping table associated with the content provider. The online system sends 570 the generated label accuracy report to the content provider.

Process for Determining a Quality of Tracking by a Website

Figure 6:
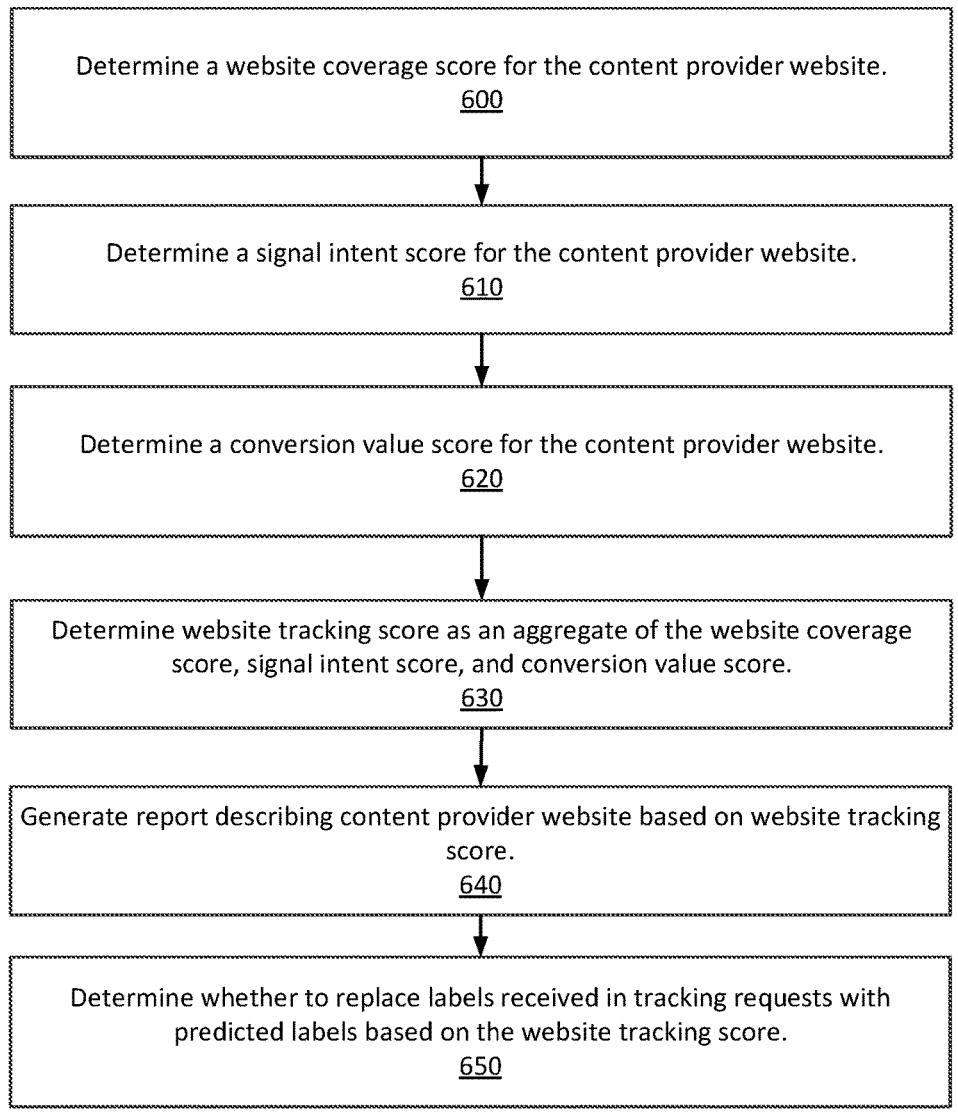
FIG. 6 illustrates a flowchart of the process for determining a website tracking score for a content publishing website, in accordance with an embodiment.

FIG. 6 illustrates a flowchart of the process for determining a website tracking score for a content publishing website 130, in accordance with an embodiment. The website score generator 250 determines a website tracking score for a content publishing website 130 indicating a quality of tracking instructions provided by the website to client devices. The quality of tracking instructions provided by the content publishing website 130 determines the quality of tracking requests that client devices provide to the online system. Accordingly, the quality of tracking determines the quality of reports describing a content publishing website 130 generated by the online system 110 as well as the accuracy of the analysis performed by the online system to determine whether to update labels received in tracking requests generates by webpages of the website.

The online system determines various scores for the content publishing website 130, each score based on a particular aspect of tracking instructions provided by the content publishing website 130 to client devices. The website coverage score module 260 determines 600 a website coverage score for the content publishing website 130. The signal intent score module 265 determines 610 a signal intent score for the content publishing website 130. The conversion value score module 270 determines 620 a conversion value score for the content publishing website 130. Details of the processes for generating various scores for the content publishing website 130 are further described herein, for example, in FIGS. 7-9.

The website tracking score module 275 aggregates the various scores determined in steps 600, 610, and 620 to determine 630 the website tracking score. The score analysis module 280 generates 640 a report describing the content publishing website 130 based on the content tracking score. The generates report may describe individual scores such as signal intent score, website coverage score, and so on in the report and provide recommendation to the website based on the scores. For example, the score analysis module 280 may identify specific web pages that are missing instructions for generating tracking requests recommending that the content publishing website 130 should include tracking requests for these web pages. If the website tracking score is below a threshold value, the score analysis module 280 determines 650 that the online system should replace labels received from tracking requests with labels predicted by the online system.

Figure 7:
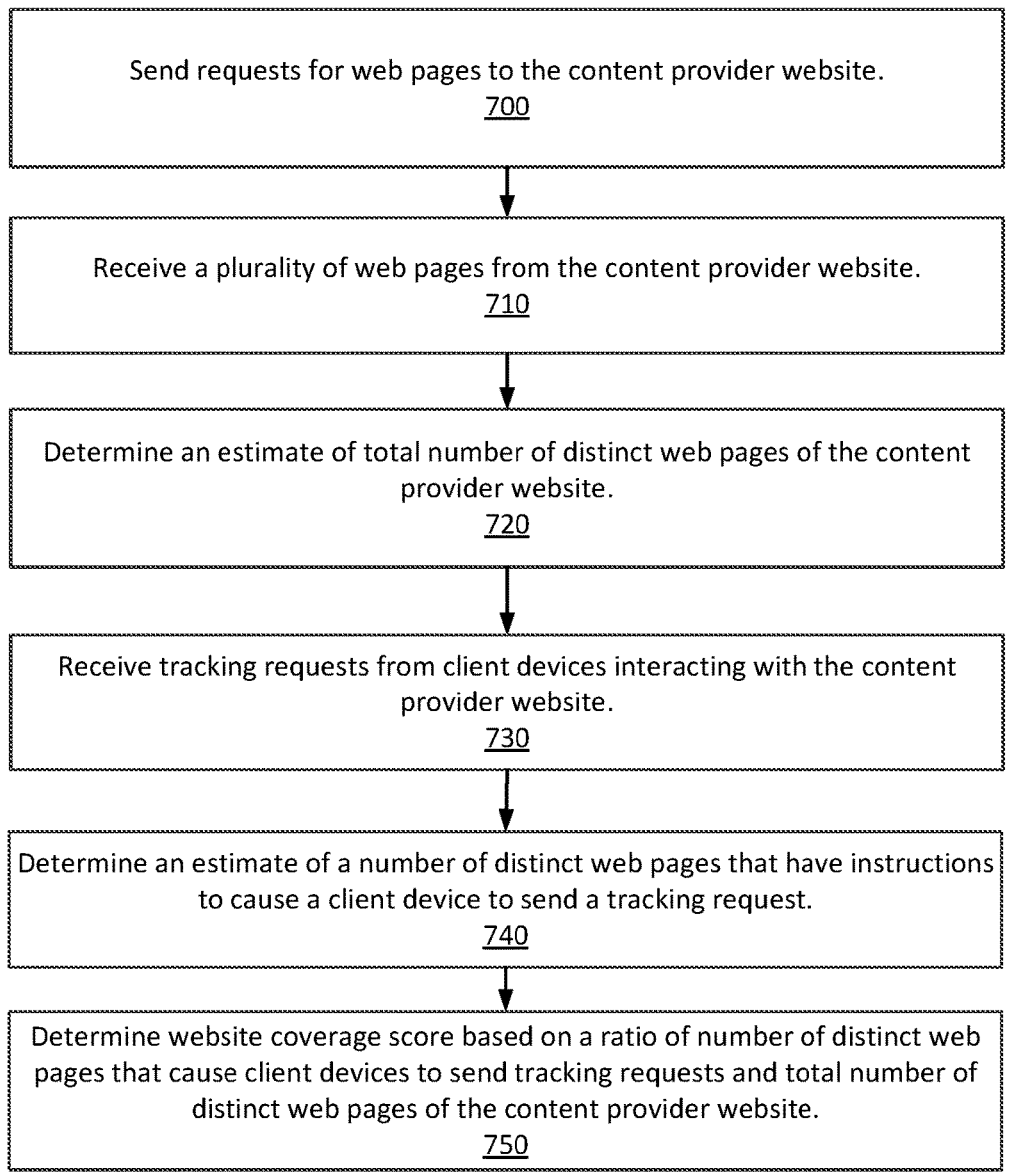
FIG. 7 illustrates a flowchart of the process for determining a website coverage score for a content publishing website, in accordance with an embodiment.

FIG. 7 illustrates a flowchart of the process for determining a website coverage score for a content publishing website 130, in accordance with an embodiment. The website crawler 255 sends 700 requests for web pages to the content publishing website 130.

The website crawler 255 accesses a content generator website 130 to determine different types of web pages hosted by the content generator website 130. In an embodiment, the website crawler 255 receives a set of seed web pages of the content generator website 130, for example, an index page that includes URLs (or links) to other web pages of the content generator website 130. The website crawler 255 follows each URL that points to another web page of the content generator website 130. The website crawler 255 stores each web page received. The website crawler 255 continues the process of selecting a stored web page, identifying URLs within the selected web page that point to other web pages of the content generator website 130, and retrieving the other web pages. The website crawler 255 repeats these steps until it fails to retrieve any new web page that was not already accessed.

In an embodiment, the website crawler 255 simulates requests sent by a client device to the content generator website 130 to retrieve dynamically generated web pages from the content generator website 130. Accordingly, the website crawler 255 may simulate various types of sessions that a user may perform using a client device with the content generator website 130. The website crawler 255 stores the retrieved web pages.

In an embodiment, the website crawler 255 compares web pages in a manner that ignores differences in data values of the web page. For example, the website crawler 255 considers two checkout web pages as identical even if the products in shopping cart are different. Similarly, the website crawler 255 considers two view shopping cart web pages as identical even if the products in the shopping cart are different.

The online system 110 receives 730 tracking requests received from various client devices and determines a number of unique web pages identified in the tracking requests. The website coverage score module 260 may identify the unique web pages by analyzing the URL for the web page that generated the tracking request as reported by the client device. The website coverage score module 260 matches the URLs reported by the tracking requests with the URLs retrieved by the website crawler 255. The website coverage score module 260 normalizes the URLs before matching them. For example, the website coverage score module 260 may remove certain parameter values in the URL before comparison so that two URLs that differ only in these parameter values are considered equivalent.

The website coverage score module 260 determines 740 an estimate of a number of distinct web pages that have instructions to cause a client device to send a tracking request. The website coverage score module 260 determines 750 the website coverage score for the content generator website 130 based on a ratio of the number of unique URLs identified in the tracking requests retrieved from various client devices and the total number of unique web pages of the content generator website 130. The website coverage score module 260 may determine the website coverage score for the content generator website 130 based on a percentage of web pages of the website coverage score for the content generator website 130 that generate tracking requests.

In an embodiment, the website coverage score module 260 invokes the tracking request label predictor 112 to determine a predicted label for tracking requests received from client devices. The website coverage score module 260 compares the predicted labels with the labels received from the client devices with the tracking requests to determine whether the tracking requests include accurate labels. If the website coverage score module 260 determines that the tracking requests include incorrect labels for certain tracking requests, the website coverage score module 260 marks these tracking requests. The website coverage score module 260 determines a website coverage score as a weighted aggregate of the tracking requests wherein a tracking request that sends incorrect label is weighted lower than a tracking request that sends an accurate label.

Figure 8:
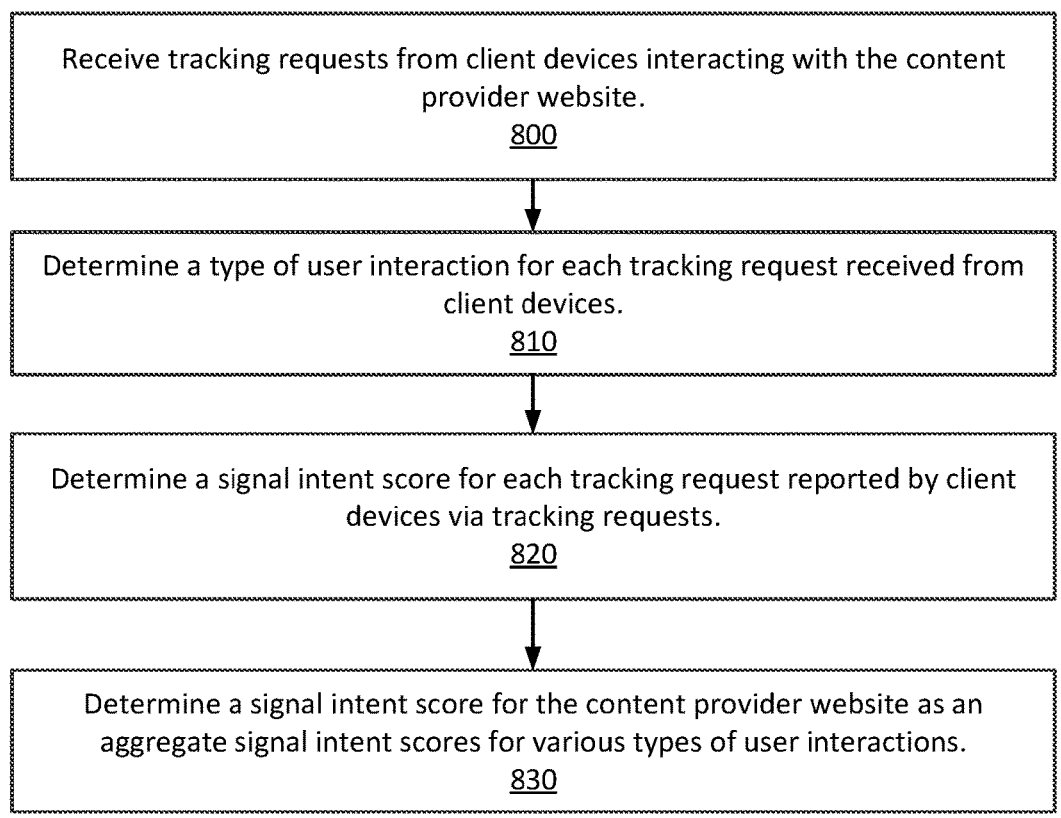
FIG. 8 illustrates a flowchart of the process for determining a signal intent score for a content publishing website, in accordance with an embodiment.

FIG. 8 illustrates a flowchart of the process for determining a signal intent score for a content publishing website 130, in accordance with an embodiment. The online system 110 receives 800 tracking requests from client devices interacting with the content publishing website 130. The signal intent score module 265 determines 810 a type of user interaction for each tracking request received from client devices. The signal intent score module 265 may determine the type of user interaction based on the label provided by the client device for the tracking request or based on a predicted label determined by the online system 110. In an embodiment, the signal intent score module 265 stores a mapping table representing associations between labels and types of user interactions and uses the mapping table to determine the types of user interactions for each tracking request. The signal intent score module 265 determines 820 a signal intent score for each tracking request reported by a client device via tracking requests. The signal intent score module 265 determines 830 a signal intent score for the content publishing website 130 as an aggregate signal intent scores for various types of user interactions.

In an embodiment, the signal intent score for a web site is high if the website provides tracking requests for different types of signal intents during a session rather than only high signal intent. Accordingly, the website score generator 250 monitors different types of web pages that are generated during a session of a user with the content publishing website 130. In an embodiment, the website crawler 255 interacts with the content publishing website 130 to identify different types of web pages during a session. For example, the website crawler 255 may use a test account to interact with the content publishing website 130 and identify web pages including product search web pages, web pages that allow user to add products to a shopping cart, web pages that allow a user to checkout, and web pages that allow a user to make payment for a transaction. Some of these web pages are associated with a low signal intent and some are associated with a high intent signals.

The signal intent score module 265 analyzes tracking requests received from client devices to determine different types tracking requests received for a complete session of the client device with the content publishing website 130. The signal intent score module 265 assigns a high score to the content publishing website 130 if different types of tracking requests for a session are received from the client device as compared to only a few types of tracking requests. Accordingly a website that provides tracking requests with low signal intent as well as tracking requests with high signal intent receives a higher score compared to a website that provides only tracking requests having high signal intent.

In an embodiment, the signal intent score module 265 automatically assigns a signal intent score for a webpage. The signal intent score for a web page indicates a likelihood of a user performing a user interaction identified as a conversion if the user performs a user accesses the web page. The signal intent score module 265 receives from the website crawler 255 a sequence of web pages accessed during a session of a client device with the website. The signal intent score module 265 ranks the web page in the order in which the web pages are accessed during a user session. The signal intent score module 265 assigns signal intent score to web pages based on the order in which the web page appears in the sequence. Accordingly, the signal intent score module 265 assigns low signal intent scores to web pages that are accessed early in the sequence during a session and assigns high signal intent scores to web pages that are accessed later in the sequence during a session.

Figure 9:
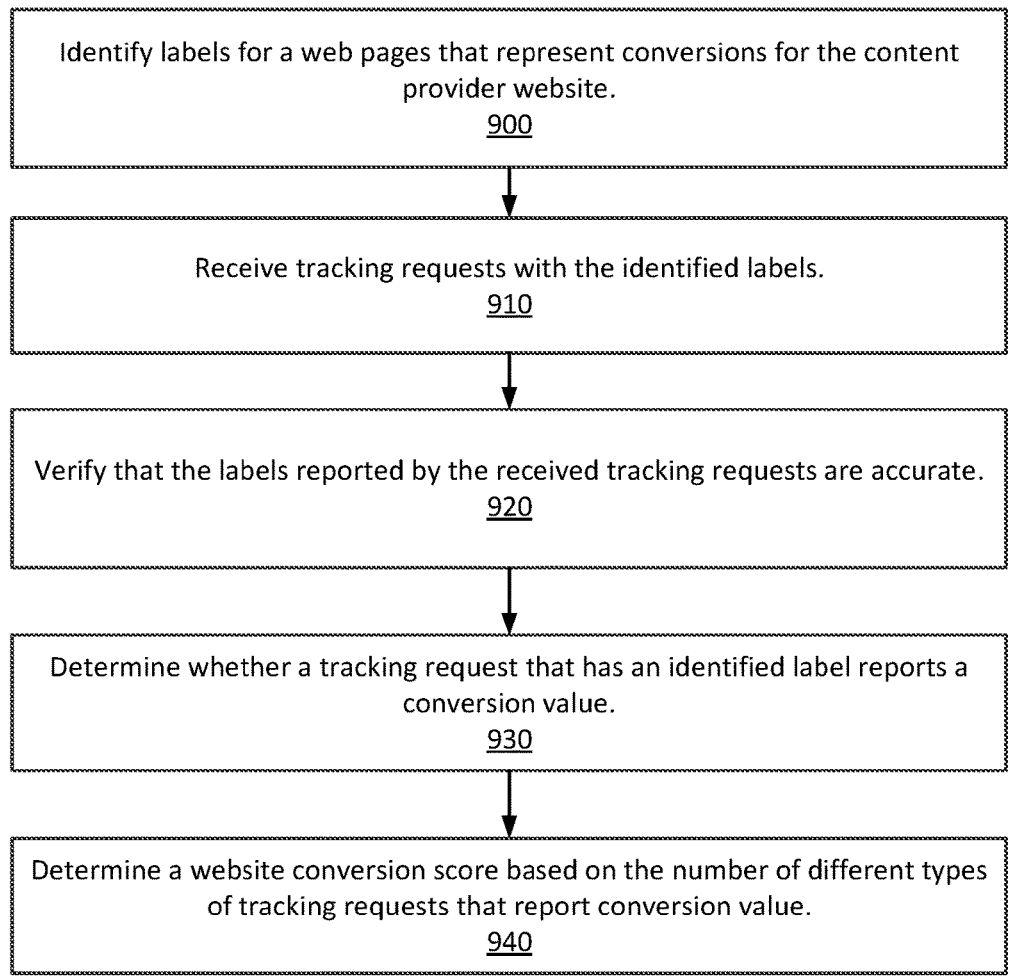
FIG. 9 illustrates a flowchart of the process for determining a conversion score for a content publishing website 130, in accordance with an embodiment.

FIG. 9 illustrates a flowchart of the process for determining a conversion score for a content publishing website 130, in accordance with an embodiment. A conversion refers to a user interaction that is of particular significance to the content publishing website 130. For example, the user interaction may result in the content publishing website 130 receiving remuneration. Examples of user interactions identified as conversions include a user performing a transaction using the content publishing website 130 or submitting a form for registering with the content publishing website 130 or with another system. If the user interaction corresponds to a transaction, the remuneration of the content publishing website 130 may depend on the amount of transaction. The client device may provide the value of the transaction to the online system via tracking request.

The conversion value score module 270 identifies 900 labels for web pages that perform a conversion. In an embodiment, the labels for the web pages that perform the conversion are provided by a user. Alternatively, the conversion value score module 270 may determine identify the web page that performs conversion by analyzing the web page to determine whether the web page includes specific types of widgets or keywords. In an embodiment, the conversion value score module 270 stores the types of widgets or keyword in web pages that are likely to occur in a web page that performs conversions. For example, the conversion value score module 270 may store information that a web page that allows a user to submit a registration includes one or more fields for entering values and a submit button. Furthermore, the conversion value score module 270 may store information that the fields for entering values are likely to include labels such as "first name", "last name", and so on.

The website score generator 250 receives 910 tracking requests with the identified labels. The conversion value score module 270 verifies whether the received labels with the tracking requests by comparing the received labels with predicted labels. The conversion value score module 270 identifies tracking requests associated with conversions based on the verification. In some embodiments, the conversion value score module 270 uses a predicted label for a tracking request to determine whether the tracking request corresponds to a conversion.

The conversion value score module 270 determines 930 whether the tracking request that corresponds to a conversion provides a conversion value as a parameter. In an embodiment, the conversion value score module 270 stores a list of parameter names that are likely to represent a conversion value. The conversion value score module 270 compares parameters received with the tracking requests with the stored parameter names. If the name of a received parameter matches the stored parameter names, the conversion value score module 270 may further check type of the value to verify if it matches an expected type of conversion value. For example, the conversion value score module 270 may determine whether the parameter value represents a numeric representation of dollars and cents.

A web page may have a plurality of web pages that perform conversions. Accordingly, the conversion value score module 270 identifies a number of web pages of the website that include instructions that cause a client device 120 to provide a conversion value in a tracking request. The conversion value score module 270 determines 940 a website conversion value score for the content publishing website 130 based on a number of the web pages of the content publishing website 130 that perform conversion that include instructions to provide conversion values with the tracking requests generated by client devices.

Alternative Embodiments

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A computer-implemented method comprising:
receiving, by an online system, a plurality of tracking requests from one or more client devices, each tracking request received responsive to a client device of the one or more client devices presenting a web page received from a website, the web page comprising tracking instructions for generating tracking requests responsive to rendering the web page on the client device, the tracking request configured to send information describing the web page to the online system;
for each of the plurality of tracking requests associated with the website:
determining a type of user interaction represented by the tracking request, the type of user interaction determined based on information received in the tracking request;
determining a signal intent score for the tracking request based on the type of user interaction, the signal intent score indicating a likelihood of a user performing a particular user interaction with the website;
generating a website tracking score for the website based on the signal intent scores for the tracking requests associated with the website, the website tracking score indicative of a quality of tracking requests generated by the website;
responsive to the website tracking score for the website indicating a low quality of tracking requests generated by the website, generating a report describing interactions of client devices with the website, the report using labels predicted by the online system, each label corresponding to a webpage sent by the website to a client device; and
sending the generated report for presentation to users associated with the website.

2. The computer-implemented method of claim 1, wherein the tracking instructions are executed responsive to displaying a tracking pixel of the webpage rendered by on the client device.

3. The computer-implemented method of claim 1, wherein the signal intent score for the tracking request associated with the web page is determined based on an order in which the web page occurs within a session between the client device and the website, the web page associated with the tracking request.

4. The computer-implemented method of claim 3, further comprising:
sending, by the online system, a plurality of requests for web pages of the website, the plurality of requests representing a session between the online system and the website;
receiving, by the online system, a plurality of web pages from the website, each web page received responsive to a request for a web page; and
ranking the web pages in the order in which the web pages are received during the session.

5. The computer-implemented method of claim 3, wherein a signal intent score for a tracking request associated with a web page that occurs later in the session is determined to be higher than a signal intent score for a tracking request associated with a web page that occurs earlier in the session.

6. The computer-implemented method of claim 1, further comprising:
determining, by the online system, a signal intent score for the website, wherein the determined signal intent score is an aggregate of one or more signal intent scores associated with various types of user interactions.

7. A non-transitory computer readable storage medium having instructions encoded thereon that, when executed by a processor, cause the processor to perform the steps including:
receiving, by an online system, a plurality of tracking requests from one or more client devices, each tracking request received responsive to a client device of the one or more client devices presenting a web page received from a website, the web page comprising tracking instructions for generating tracking requests responsive to rendering the web page on the client device, the tracking request configured to send information describing the web page to the online system;
for each of the plurality of tracking requests associated with the website:
determining a type of user interaction represented by the tracking request, the type of user interaction determined based on information received in the tracking request;
determining a signal intent score for the tracking request based on the type of user interaction, the signal intent score indicating a likelihood of a user performing a particular user interaction with the website;
generating a website tracking score for the website based on the signal intent scores for the tracking requests associated with the website, the website tracking score indicative of a quality of tracking requests generated by the website;
responsive to the website tracking score for the website indicating a low quality of tracking requests generated by the website, generating a report describing interactions of client devices with the website, the report using labels predicted by the online system, each label corresponding to a webpage sent by the website to a client device; and
sending the generated report for presentation to users associated with the website.

8. The non-transitory computer readable storage medium of claim 7, wherein the tracking instructions are executed responsive to displaying a tracking pixel of the webpage rendered by on the client device.

9. The non-transitory computer readable storage medium of claim 7, wherein the signal intent score for the tracking request associated with the web page is determined based on an order in which the web page occurs within a session between the client device and the website, the web page associated with the tracking request.

10. The non-transitory computer readable storage medium of claim 9, further comprising:
sending, by the online system, a plurality of requests for web pages of the website, the plurality of requests representing a session between the online system and the website;
receiving, by the online system, a plurality of web pages from the website, each web page received responsive to a request for a web page; and
ranking the web pages in the order in which the web pages are received during the session.

11. The non-transitory computer readable storage medium of claim 9, wherein a signal intent score for a tracking request associated with a web page that occurs later in the session is determined to be higher than a signal intent score for a tracking request associated with a web page that occurs earlier in the session.

12. The non-transitory computer readable storage medium of claim 7, further comprising:
   determining, by the online system, a signal intent score for the website, wherein the determined signal intent score is an aggregate of one or more signal intent scores associated with various types of user interactions.

13. A computer system comprising:
   one or more electronic processors; and
   a non-transitory computer readable storage medium, storing instructions for the steps comprising:
      receiving, by an online system, a plurality of tracking requests from one or more client devices, each tracking request received responsive to a client device of the one or more client devices presenting a web page received from a website, the web page comprising tracking instructions for generating tracking requests responsive to rendering the web page on the client device, the tracking request configured to send information describing the web page to the online system;
      for each of the plurality of tracking requests associated with the website:
      determining a type of user interaction represented by the tracking request, the type of user interaction determined based on information received in the tracking request;
      determining a signal intent score for the tracking request based on
      the type of user interaction, the signal intent score indicating a likelihood of a user performing a particular user interaction with the website;
      generating a website tracking score for the website based on the signal intent scores for the tracking requests associated with the website, the website tracking score indicative of a quality of tracking requests generated by the website;
      responsive to the website tracking score for the website indicating a low quality of tracking requests generated by the website, generating a report describing interactions of client devices with the website, the report using labels predicted by the online system, each label corresponding to a webpage sent by the website to a client device; and
      sending the generated report for presentation to users associated with the website.

14. The computer system of claim 13, wherein the tracking instructions are executed responsive to displaying a tracking pixel of the webpage rendered by on the client device.

15. The computer system of claim 13, wherein the signal intent score for the tracking request associated with the web page is determined based on an order in which the web page occurs within a session between the client device and the website, the web page associated with the tracking request.

16. The computer system of claim 15, further comprising:
   sending, by the online system, a plurality of requests for web pages of the website, the plurality of requests representing a session between the online system and the website;
   receiving, by the online system, a plurality of web pages from the website, each web page received responsive to a request for a web page; and
   ranking the web pages in the order in which the web pages are received during the session.

17. The computer system of claim 15, wherein a signal intent score for a tracking request associated with a web page that occurs later in the session is determined to be higher than a signal intent score for a tracking request associated with a web page that occurs earlier in the session.

* * * * *